Feb. 25, 1958 E. S. PETERSON 2,824,907

MULTI-CHANNEL MESSAGE ANNOUNCER FOR USE IN TELEPHONE SYSTEMS

Filed Oct. 6, 1954 4 Sheets-Sheet 1

INVENTOR.
EDWARD S. PETERSON

BY [signature]

ATTY.

Feb. 25, 1958 E. S. PETERSON 2,824,907

MULTI-CHANNEL MESSAGE ANNOUNCER FOR USE IN TELEPHONE SYSTEMS

Filed Oct. 6, 1954 4 Sheets-Sheet 2

INVENTOR.
EDWARD S. PETERSON
BY Wm. Walter Owen
ATTY.

INVENTOR.
EDWARD S. PETERSON
BY Wm Walter Owen
ATTY.

INVENTOR.
EDWARD S. PETERSON
BY McWatters Owen.
ATTY.

United States Patent Office 2,824,907

Patented Feb. 25, 1958

2,824,907

MULTI-CHANNEL MESSAGE ANNOUNCER FOR USE IN TELEPHONE SYSTEMS

Edward S. Peterson, Elmwood Park, Ill., assignor to General Telephone Laboratories, Incorporated, a corporation of Delaware Application October 6, 1954, Serial No. 460,663

8 Claims. (Cl. 179—6)

This invention relates in general to a system for transmitting recorded messages to telephone lines and particularly to arrangements in which the recorded messages provide information ordinarily provided by switchboard operators or by tones.

It is an object of the invention to provide a compact, economical multi-channel recorder that permits the messages in all the channels to be transmitted simultaneously.

It is another object of this invention to provide means for connecting a telephone line to a particular one of a number of messages in a multi-channel message announcer.

According to one feature of this invention calls that are ordinarily routed to an intercept operator are connected to a message announcer and a recorded message, appropriate to the reason for intercepting the call, is transmitted to the connection.

According to another feature of this invention the recorded message is repeatedly transmitted to the telephone connection as long as the connection is held.

It is common practice in telephone systems to provide intercepting service for telephone numbers to which service has been discontinued and also to unused numbers which in an automatic telephone system are connected to accidently either as a result of faulty dialing or by misreading a telephone number listed in the directory or as a result of faulty operation of the switching equipment. An intercept operator on answering such a call inquires as to the number being called and then gives the calling party information in accordance with the class of call which has been intercepted.

In accordance with the present invention calls to telephone numbers to which service has been discontinued will be routed to a particular channel in a message announcer and an appropriate message will be transmitted to the calling line.

Likewise calls to unused selector levels will be routed to another channel in the message announcer and a different message will be transmitted to the calling line.

The present invention also provides for replacing a warning tone that indicates a reverting call, that is a call from one telephone to another telephone on the same line, by an appropriate message in one of the channels of the message announcer. In making a reverting call, the calling party hangs up to start the ringing of the called telephone. The calling party cannot ascertain exactly when the called party answers and the called party after answering and hearing no one on the line may abandon the call. In some systems a tone is connected to the line immediately after the ringing current is cut off and this tone is used to inform the answering party that the call is a reverting call. In the present invention the reverting call circuit is connected to a channel of the message announcer and an appropriate voice message is transmitted to the connection.

In some systems the length of the talking period is controlled and the parties on the connection are warned by a special tone that the end of a talking period is approaching. The present invention provides for extending such connections to a channel of the message announcer so that a voice message can be transmitted to the connection.

The objects and features of this invention together with the operation of the circuits and apparatus embodying the same will be described hereinafter, reference being had to the accompanying drawings comprising Figs. 1 to 7 inclusive. The drawings should be arranged with Fig. 5 to the right of Fig. 4 and Fig. 6 to the right of Fig. 5.

Figure 7:
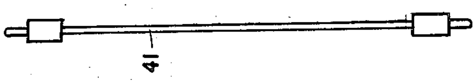
Fig. 7 shows a patching cord for connecting the amplifiers to the play back heads.
Figure 3:
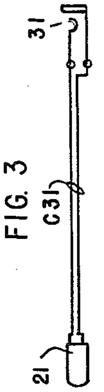
Fig. 3 shows a play back head and its associated jack.
Figure 2:
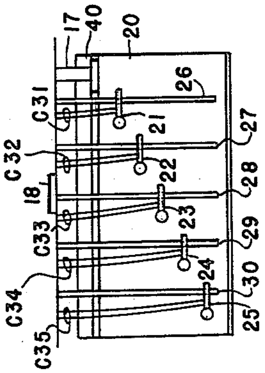
Fig. 2 is a top plan view of the recorder drum and associated play back heads.
Figure 1:
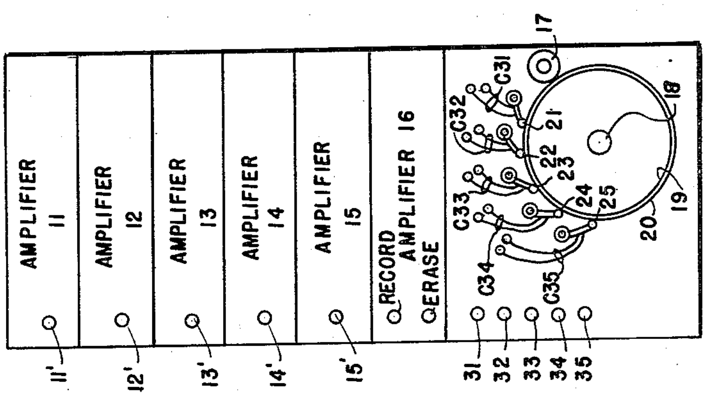
Fig. 1 is a front elevational view of a message recorder and associated amplifiers.

As shown in Figs. 1 and 2 the recorder comprises a drum 19 which is supported by the shaft 18. A tape 20 is mounted on the drum 19 so that when the drum 19 is rotated around the shaft 18 the tape 20 is driven past the play back heads or magnetic reproducer heads 21 to 25 inclusive. The tape 20 is preferably made of rubber impregnated with iron oxide. Each of the play back heads is associated with a different channel on the tape 20, and by means of patching cords such as 41 may be connected to amplifiers 11 to 15 inclusive thru jacks 11' to 15' and jacks 31 to 35 inclusive. The amplifier 16 can be connected to any of the play back heads thru the jack Erase to erase any recording in the channel with which the head is associated or thru the jack Record for the purpose of recording information in a channel. The drive shaft 17 engages with the rubber tape 40 to drive the drum 19 in a counterclockwise direction. The play back heads 21 to 25 are mounted on the supports 26 to 30 respectively and are aligned or separate channels on the tape 20 as shown in Fig. 2.

The shaft 18 and the drive shaft 17 are supported on the lower panel of Fig. 1 in any convenient manner. The drive shaft 17, is raised and lowered under control of the clutch magnet 46 and the spring 49 (Fig. 4) so that it will engage with the rubber tape 40 to drive the drum 19 when desired. A start relay 50 controls clutch magnet 46 and the motor 42 to cause the drum 19 to be rotated on the shaft 18. Cam 43 and cam springs 44 and 45 provide a normal stopping point for the drum 19.

Figure 4:
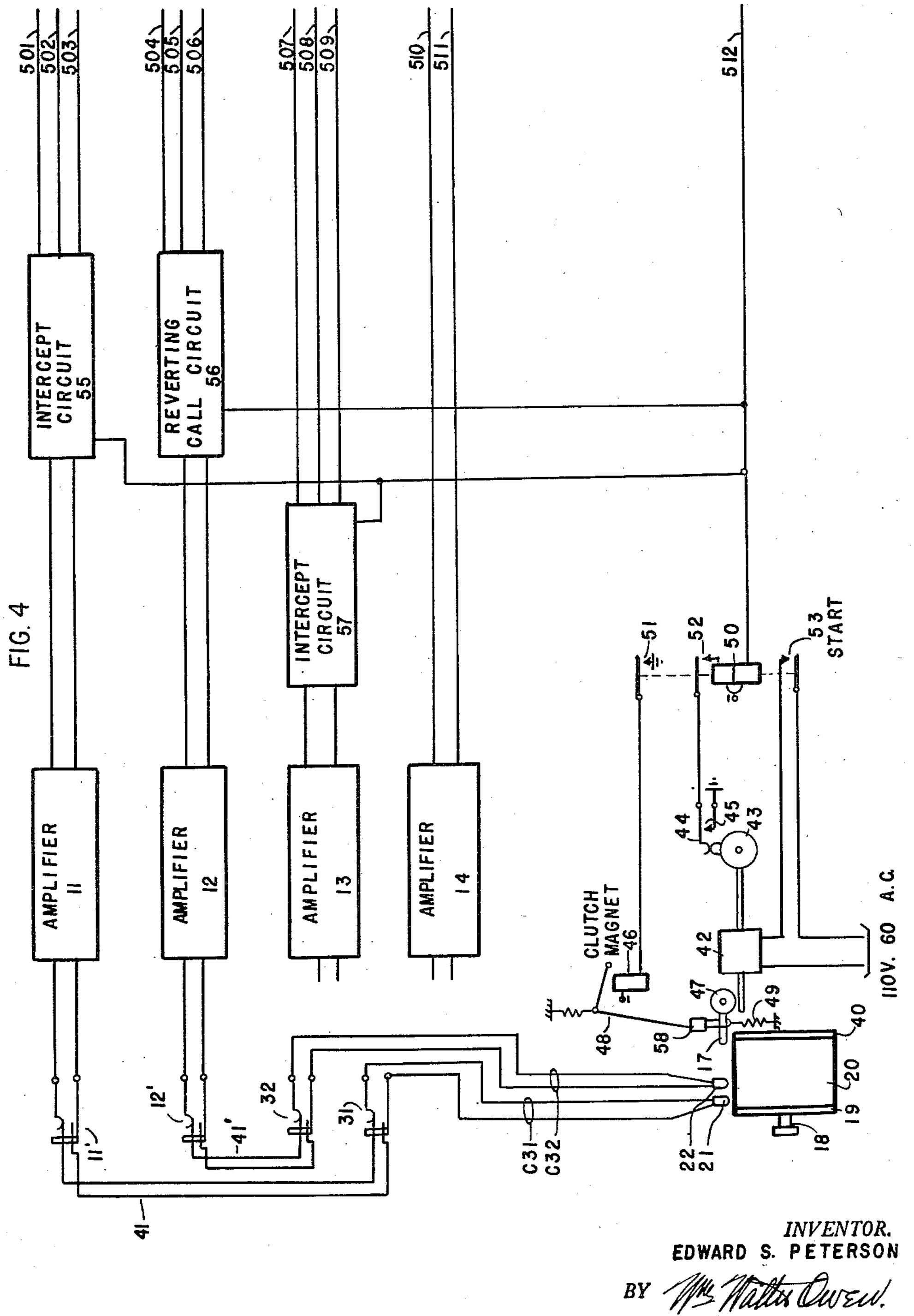
Fig. 4 is a schematic diagram showing the connection of the amplifiers to the play back head and to the telephone switching equipment.
Figure 5:
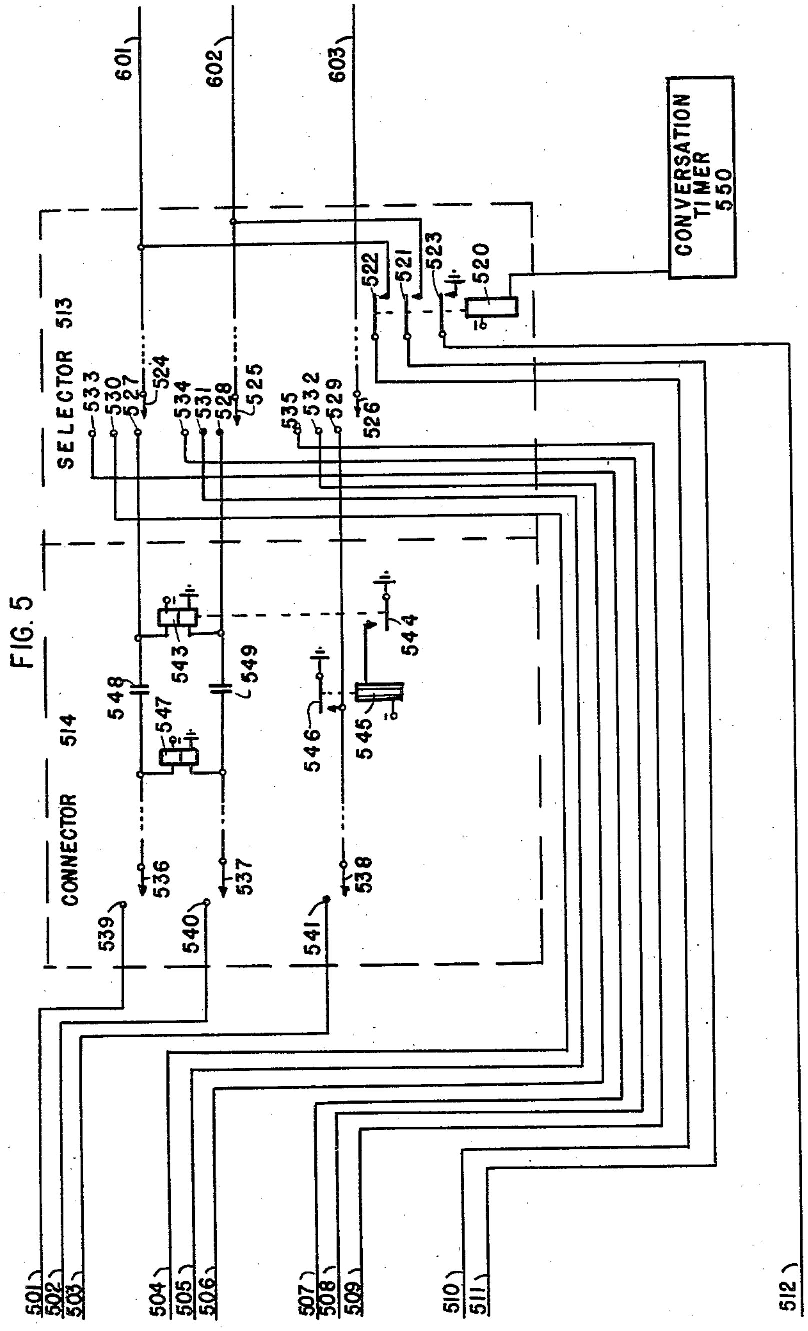
Fig. 5 is a skeletonized drawing of a selector and connector for connection to Fig. 4.
Figure 6:
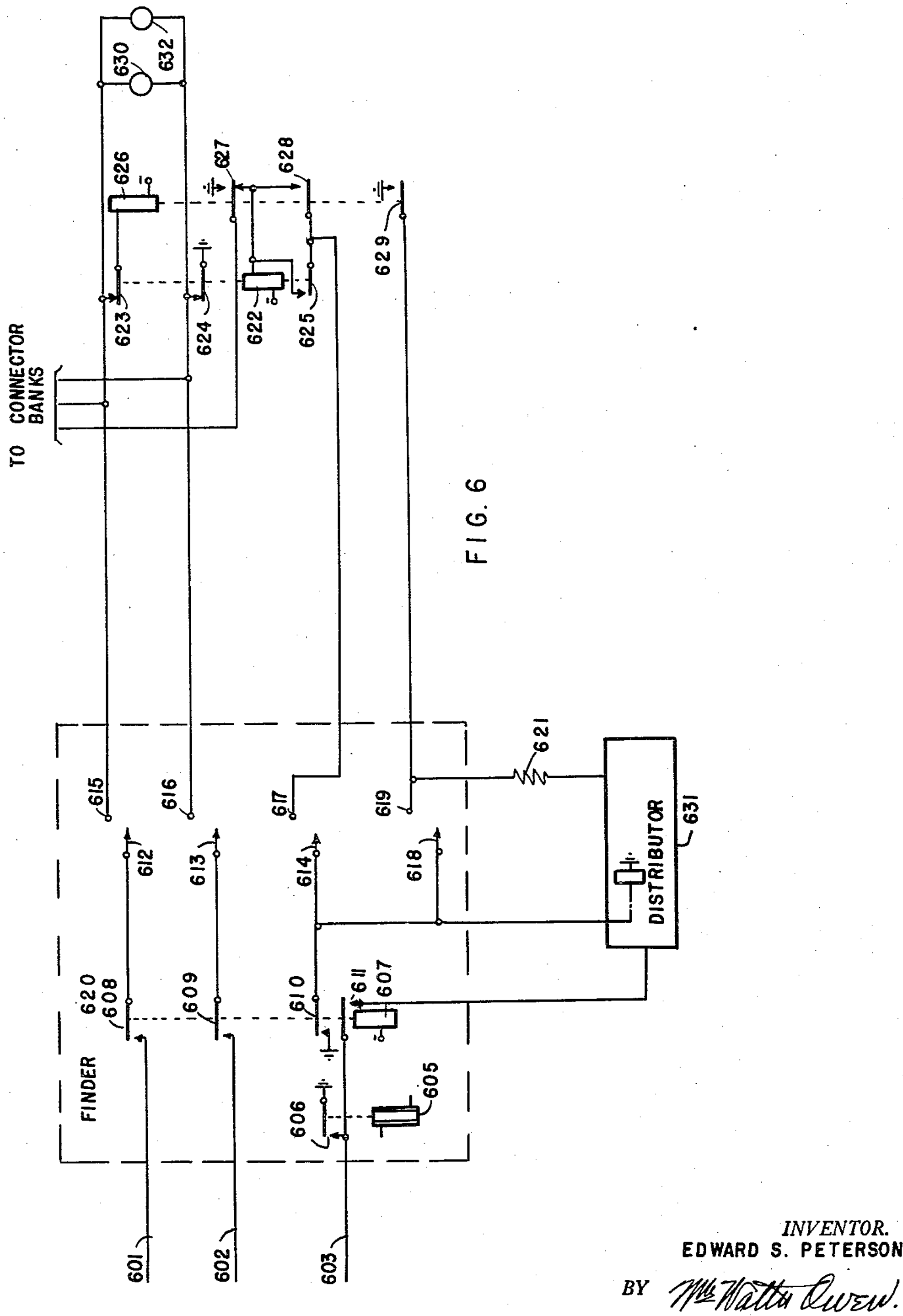
Fig. 6 shows a telephone line and a skeletonized drawing of a finder for connection to the selector in Fig. 5.

In Fig. 4 amplifier 11 is shown connected thru jack 11', cord 41, jack 31 and conductors C31 to head 21. Amplifier 12 is shown connected thru jack 12', a cord such as 41', jack 32 and conductors C32 to head 22. In a like manner the amplifiers 13, 14 and 15 can be connected to heads 23, 24 and 25. It may be noted that by means of cords such as 41 any of the amplifiers may be connected to any one of the play back heads.

In order to record a message in any of the channels on the tape 20 the associated head is connected thru a cord such as cord 41 to the amplifier 16 thru jack Record. A microphone (not shown) associated with the amplifier is used to transmit the message to the amplifier and the start relay 50 is operated in any convenient manner at this time to cause rotation of the drum 19.

Messages recorded on the tape 20 can be erased by connecting the associated head with the jack Erase of amplifier 16 and operating the relay 50 to cause rotation of the drum 19.

When the receiver is removed at telephone 630 relay 626 operates, connects ground to its upper armature to make the line busy to connectors, at armature 628 connects battery thru relay 622 to contact 617 to mark the line as a calling line in the finder banks, and at armature 629 connects ground thru resistance 621 to distributor 631 to start a finder.

The finder 620 is one of a group of finders controlled by distributor 631 and having access to the contacts 615, 616 and 617 to which telephone 630 is connected. Assume now that the finder 620 is caused to hunt for the calling line. The wiper 618 hunts over contacts such as contact 619 and at contacts 619 encounters direct ground from armature 629. This direct ground causes the movement of wiper 618 to stop and wipers 612, 613 and 614 are moved over contacts such as contacts 615, 616 and 617. When wiper 614 is stepped onto contact 617 battery thru the coil of relay 622, contact 617, and wiper 614 to ground thru a relay in the distributor, stops the movement of the finder and operates relay 622. Relay 622 disconnects relay 626 from the line at armature 623, disconnects ground from the line at armature 624 and closes a holding circuit for itself at armature 625. Relay 626 releases and disconnects ground from the distributor 631 at armature 629.

Relay 607 is operated from the distributor, locks to ground at armature 606 and at armature 608 and 609 extends the line thru to the selector 513. At armature 610 ground is connected to wiper 614 and thru contact 617 and armature 625 to hold relay 622. This ground also extends thru armature 627, restored, to a contact in the connector banks (not shown) to make the line busy.

The selector 513 is preferably of the well-known Strowger type that responds to the operation of the dial at the telephone 630 to position its wipers 524, 525 and 526 adjacent the level of contacts corresponding to the number dialed. During the interval between digits the selector 513 operates automatically to select an idle line in the selected group of lines. Assuming now that the selector 513 has been moved adjacent the group of lines including the contacts 527, 528 and 529 and that the wipers 524, 525 and 526 have been automatically stepped to these contacts, the connector 514 will now be operated by the next digits from telephone 630 and its wipers 536, 537 and 538 can be connected to contacts such as contacts 539, 540 and 541. These contacts are associated with a telephone number which is listed in the telephone directory but to which telephone service is no longer given. Instead the contacts 539, 540 and 541 are connected to the intercept circuit 55 over conductors 501, 502 and 503.

Intercept circuit 55 is of the well-known type but preferably similar to the intercept circuit shown in Patent 2,333,039, issued October 26, 1943, to E. S. Peterson. Intercept circuit 55 is connected to amplifier 11 and to start relay 50, and when seized by connector 514 energizes relay 50. Relay 50 at armature 51 energizes clutch magnet 46, prepares a holding circuit for itself at armature 52 and closes a circuit to motor 42 at armature 53. The clutch magnet 46 when energized pulls down the lever 48 and allows the support 58 to drop and cause drive shaft 17 to engage the rubber tape 40 and the drive wheel 47 to engage the drive shaft of the motor 42. The spring 49 holds the drive shaft 17 against the rubber tape 40 with pressure suitable for causing rotation of the drum 19. The tape 20 is thus driven past the head 21 and on the channel associated with the head 21 a suitable message has been magnetically registered. This message will be transmitted to the calling line thru amplifier 11 and will inform the calling party that telephone service is no longer given to the called number.

When the receiver is replaced at telephone 630 connector 514 is released and removes ground from contact 529 thus allowing selector 513 and finder 620 to release. Intercept circuit 55 also releases and disconnects ground from relay 50. Relay 50 remains operated until cam 43 reopens springs 44 and 45 thus opening the circuit to the upper winding of the relay 50. Relay 50 releases and opens the circuit to motor 42 at armature 53 and to clutch magnet 46 at armature 51.

Assuming now that selector 513 has been seized as previously described and has been operated adjacent the group of lines including the contacts 533, 534 and 535 and that the wipers 524, 525 and 526 have been operated to engage these contacts. These contacts represent a selector level which is not assigned for use and one which would only be reached because of an error in dialing or as a result of faulty operation of the selector 513. Contacts 533, 534 and 535 are connected over conductors 507, 508 and 509 to intercept circuit 57.

Intercept circuit 57 is of conventional type for terminating selector levels, including a bridge connected to conductors 507 and 508 and a holding potential which can be connected to selector 513 over conductor 509. Intercept circuit 57 is connected to amplifier 13 and to start relay 50. When intercept circuit 57 is seized relay 50 is energized and causes motor 42 to rotate the drum 19 as previously described. Amplifier 13 is connected to head 23 thru jacks 13′ and 33 by means of a patching cord such as cord 41. The channel with which the head 23 is associated has magnetically recorded therein information to the effect that an unused number has been connected with and suggesting that the calling party disconnect, consult the directory and try again to make the desired connection. The receiver being replaced at telephone 630 the equipment releases as previously described.

Should the selector 513 be connected to contacts 530, 531 and 532 and over conductors 504, 505 and 506 to reverting call circuit 56 another telephone on the same line can be signalled and thus a connection can automatically be established between telephones on the same lines. Reverting call circuit 56 may be of the conventional type but is preferably a circuit like the reverting call circuit disclosed in Patent 2,287,383, issued June 23, 1942, to C. E. Lomax.

Assume that the telephone 630 has been used to effect a connection to reverting call circuit 56 and that the reverting call circuit has been operated under control of the dial to signal the telephone 632. After having established this connection the receiver at the telephone 630 is replaced and the bells of the called and calling telephone ring alternately. When the receiver is removed at the called (or calling) telephone ringing current is disconnected and a connection suitable for conversation is established.

In this invention the reverting call circuit 56 is connected to the amplifier 12 and to the start relay 50. When the receiver is removed at the called (or calling) telephone relay 50 is energized and the drum 19 is rotated as previously described. Amplifier 12 is connected to head 22 and a message stating that the call is from a telephone on the same line is recorded in the channel associated with head 22. The amplifier 12 is connected to the talking conductors in the reverting call circuit 56 for a short time, about the time required to repeat the message, immediately after the ringing current is disconnected and is then disconnected from the talking leads so that there will be no interference with the regular conversation. The first party removing the receiver on such a call will thus be advised by the recorded message to wait until the other party has time to come in on the connection.

After ringing current has been disconnected the replacement of the receivers at the involved telephones allows the equipment to release in conventional manner.

The selector 513 is associated with a conversation timer 550. This timer may be of the type shown in Patent 2,513,426, issued July 4, 1950, to C. E. Lomax. Ordinarily the calling party is warned that the conversation period is almost over by a warning tone. In this invention amplifier 14 is connected to the selector 513 and under control of the conversation timer 550 will be connected to the talking conductors of the selector 513 when the end of the conversation period approaches. The amplifier 14 is connected to the head 24 thru jacks 14' and 34 and a patching cord such as cord 41. The relay 50 is energized from ground at armature 523 at the time that the amplifier 14 is connected to the talking conductors of the selector 513 to cause the drum 19 to be rotated as previously described. A message will be transmitted thru the head 24 and amplifier 14 advising the parties in the connection that their time limit is about to expire.

The replacement of the receiver at the calling telephone will release the equipment in the conventional manner.

Having described my invention, what is considered to be new and is desired to be protected by Letters Patent will be set forth in the following claims.

What is claimed is:

1. In a telephone system, a message announcer, an endless tape in said announcer, means for recording a plurality of messages on said tape, a plurality of play back heads in said announcer, means for moving said tape past said play back heads, a plurality of amplifiers, means for causing said play back heads to transmit different ones of said messages to each of said amplifiers responsive to the movement of said tape past said play back heads, telephones, connecting means for selectively connecting said telephones to said amplifiers, starting means for starting the movement of said tape, and connections between said connecting means and said starting means for controlling said starting means whereby movement of said tape is started responsive to connection of a telephone to one of said amplifiers.

2. In a telephone system, telephones, means for extending connections from said telephones for different services, including means for extending connections to lines to which service has been discontinued, means for extending connections to unused lines, means for extending connections to a telephone on the same line as the calling telephone, and means for extending calls to other lines, a message announcer, means for connecting said message announcer to any of said connections, and means for transmitting a message from said message announcer to said connection appropriate to the service provided by the connection to which said message announcer is connected.

3. In a telephone system, telephones, switching equipment, means for extending connections of different classes thru said switching equipment, a message announcer comprising an endless recording medium and a plurality of reproducing heads and control means, means for recording a message on said recording medium for each of said reproducing heads, means operated by said control means for driving said recording medium past said reproducing heads, connecting means governed by the class of connection extended thru said switching equipment for connecting a particular one of said reproducing heads to said connection, and connections from said connecting means to said message announcer for operating said control means to start the driving of said recording medium past said reproducing heads to cause said recorded messages to be transmitted.

4. In a telephone system, telephones, switching equipment for providing intercept service, reverting call service and conversation timing for connections extended from said telephones, means for operating said equipment under control of said telephones, a message announcer, means for recording announcements in said recorder appropriate to intercept service, reverting call service and conversation timing, and means for transmitting a message from said announcer to a telephone from which a connection has been extended in accordance with the service said switching equipment is operated to provide.

5. In a telephone system, telephones, switching equipment for extending connections from said telephones, a first intercept circuit, means effective in case a connection is extended from one of said telephones to a line to which service has been discontinued for extending said connection to said first intercept circuit, a second intercept circuit, means effective in case a connection is extended from one of said telephones to an unused line for extending said connection to said second intercept circuit, a message announcer, a plurality of play back heads for said announcer, a tape, means for recording messages on said tape, means for moving said tape past said play back heads, means responsive to a connection extended to either one of said intercept circuits for starting movement of said tape, and means responsive to moving said tape past said play back heads for transmitting a different one of said messages to each of said intercepting circuits.

6. In a telephone system, telephones, means for extending connections from said telephones to lines to which service has been discontinued, means for extending connections from said telephones to lines which have not been put into service, means for extending connections from said telephones to telephones on the same lines, means for extending connections from said telephones to telephones on other lines, a message announcer, means for recording a plurality of messages in said message announcer, means effective in response to the extension of a connection to a line to which service has been discontinued for transmitting a first one of said plurality of messages to said connection, means responsive to the extension of a connection to a line which has not been put into service for transmitting a second one of said plurality of messages to said connection, means responsive to the answering of a connection between telephones on the same line for transmitting a third one of said plurality of messages to said connection, and means effective a predetermined time after a connection between telephones on different lines has been answered for transmitting a fourth one of said plurality of messages to said connection.

7. In a telephone system, telephones, intercept circuits, reverting call circuits, a message announcer, starting means for said message announcer, switching equipment for extending connections from said telephones to said intercept circuits and said reverting call circuits, connections from said intercept circuits and said reverting call circuit for operating said starting means, and control means in said message announcer for maintaining said starting means operated for a predetermined time.

8. In a telephone system, intercept circuits of two different classes, a message announcer, a plurality of play back heads for said announcer, connections from intercept circuits of each class to a different one of said play back heads, a tape and means for moving said tape past said play back heads, starting means for starting movement of said tape, connections from intercept circuits of each class for operating said starting means, and means in said announcer for holding said starting means operated for a predetermined time.

References Cited in the file of this patent

UNITED STATES PATENTS

| | | |
|---|---|---|
| 2,191,612 | Findlay | Feb. 27, 1940 |
| 2,321,944 | Sanders | June 15, 1943 |
| 2,676,209 | Joel | Sept. 1, 1949 |